United States Patent Office 3,106,541
Patented Oct. 8, 1963

3,106,541
CATIONIC AMINOPLAST RESINS WHICH ARE FORMALDEHYDE DICYANDIAMIDE CONDENSATES AND PROCESS FOR PREPARING SAME
Stanley Lipowski, Newark, and Charles A. Fetscher, Short Hills, N.J., assignors to Nopco Chemical Company, Harrison, N.J., a corporation of New Jersey
No Drawing. Filed Nov. 7, 1958, Ser. No. 772,401
5 Claims. (Cl. 260—29.4)

This invention relates, in general, to synthetic tanning agents. More particularly, the invention relates to cationic aminoplast resin compositions and to a process for producing such compositions.

Dicyandiamide-formaldehyde condensation products, and the processes by which these products are produced, are well known in the art. German Patent No. 323,633 relates to products produced by reacting dicyandiamide and formaldehyde in the presence of sulfuric acid. Moreover, German Patent No. 325,647 discloses that products which are similar in nature to those of German Patent No. 323,-633 can be prepared, in the absence of sulfuric acid, either by the expedient of prolonged heating or by the use of condensing agents other than sulfuric acid. U.S. Patent No. 2,567,328 relates to compositions produced by the condensation of dicyandiamide and formaldehyde in the presence of an alkali.

In our copending U.S. patent application Serial No. 694,128, filed November 4, 1957, now Patent No. 2,990,-397, issued July 27, 1961, we have disclosed and claimed a new and improved class of synthetic tanning agents. The products thereof are cationic aminoplast resin compositions which are soluble and completely stable in water. They are prepared by condensing first dicyandiamide and formaldehyde, under controlled conditions, and by reacting the condensate thus produced with urea. While such products are highly satisfactory tanning agents for leather, in actual practice it has been found that their utility is somewhat limited. The products of that invention are very well suited for use in the retanning of chrome tanned stock and for use in the direct tanning of light stock, such as, calfskin or sheepskin. However, when they are employed as direct tanning agents for heavy stock, such as cowhide, penetration of the product into the leather proceeds at a relatively slow rate. This is believed to be attributable, at least in part, to the fact that the products of that invention are resins of relatively high molecular weight. The high molecular weight of those products can, in turn, be attributed to the process by which they are prepared. Thus, while it has been found that the high molecular weight resins are completely satisfactory for use as direct tannage for light stock and that the high molecular weight of the resin actually enhances the fulling of chrome tanned leather, the relatively slow rate at which it penetrates heavy stock, renders the high molecular weight product less suitable for use in the direct tannage of heavy stock.

It is the object of this invention to provide synthetic tanning agents of enhanced utility.

Another object of the invention is to provide cationic aminoplast resin compositions which are soluble and completely stable in water and which are highly suited for use in the tanning of leather of both light and heavy stock.

A further object of the invention is to provide a composition which is especially well suited for use in the white tannage of heavy stock.

A more particular object of the invention is to provide an efficient and commercially feasible process for producing such products.

Other objects of this invention will be obvious and will, in part, appear hereinafter.

It has been discovered that, when the acid-catalyzed condensation of dicyandiamide and formaldehyde is carried out under the controlled reaction conditions which will be disclosed herein, a synthetic tanning agent of very greatly enhanced utility will be obtained.

In the practice of our invention, dicyandiamide and formaldehyde are first charged into a suitable reaction vessel and intimately admixed therein. Formalin, which is an approximately 37% by weight aqueous solution of formaldehyde, is employed preferably as the source of formaldehyde. However, if desired, formaldehyde in any of its polymeric forms, as, for example, paraformaldehyde, trioxane, etc. can be used. Thus, where the term "formaldehyde" is used in present specifications and claims, it should be construed as encompassing not only formalin but also the various polymeric forms of formaldehyde as well. When either paraformaldehyde, trioxane or some other similar polymeric form of formaldehyde is used, generally that compound will be added to water and the solution thus obtained will be admixed subsequently with dicyandiamide. If desired, however, paraformaldehyde, trioxane, etc. could be added directly to a previously prepared aqueous solution of dicyandiamide. The quantity of water which is present in the reaction system is important. We have found that when the required amount of formaldehyde is employed initially in the form of a 30% to 40% by weight aqueous formaldehyde solution, the reaction system will be provided with a sufficient quantity of water to accomplish the purposes of the invention.

After the water, formaldehyde and dicyandiamide have been intimately admixed, a quantity of water-soluble acid sufficient to reduce the pH of the mixture to at least about pH 2.5 is added to the aqueous mixture. The acid serves to catalyze the condensation reaction. Thereafter, the acidified reaction mixture is stirred and heated carefully to the temperature at which the exothermic reaction commences. Generally, this will occur at some temperature within the range of from about 55° C. to 80° C. To a great extent, the acid which is used to catalyze the reaction will determine the temperature at which the exothermic reaction begins. For example, when formic acid is added to the reaction mixture, in quantities sufficiently great to reduce the pH thereof to within the range of from about 2.0 to 2.3, the exothermic reaction will commence at a temperature between about 55° C. to about 58° C. Where, however, the reaction mixture is adjusted at the outset to pH 2.2 to 2.3 using glycolic acid rather than formic acid, the exothermic reaction will commence at some temperature within the range of from about 70° C. to about 80° C. Once initiated, and if allowed to do so, the reaction would proceed rapidly to substantial completion at the boiling point of the mixture without the application of heat from any outside source. Under ordinary circumstances, completion of the reaction would be, and is, evidenced by gradual decreases in the temperature of the reaction mass from its boiling point. The product of the present invention is obtained by controlling the aforesaid normal reaction in certain respects. In the first place, our invention contemplates the exercise of stringent control over the rate at which the reaction mixture is allowed to reach its boiling point. The mixture will be found to boil at a temperature within the range of from about 95° C. to 98° C. Secondly, the boiling reaction mixture is cooled rapidly to room temperature once it reaches its boiling point. These operations are critical to the operability of our invention. If the temperature of the reaction mixture is permitted to rise too rapidly, variations in the properties of the products ultimately obtained will be noted. As a general rule, products having the desired properties will be obtained when the reaction mixture is heated slowly and gradually to the temperature at which the exothermic reaction commences and when, thereafter, the rate of the reaction is so controlled that the reaction mixture will slowly and gradually reach its boiling point. Control of the reaction rate, after the exothermic reaction temperature is reached, can be accomplished only by continually cooling the mass using some efficient means. The manner in which the mixture is cooled is not a part of the present invention and, hence, does not limit the scope thereof. However, a convenient means for accomplishing the desired result involves the use of either a jacketed reaction kettle cooled by the continuous passage of water or brine through the jacket or by the passage of water or brine through a cooling spiral immersed in the reaction mixture.

In most instances, we have found that completely satisfactory products are obtained when the reaction mixture is permitted to reach its boiling point gradually over a period of from about one to about two and one-half hours. Generally, when the exothermic reaction begins at a temperature around 55° C. the reaction mixture should be heated to that temperature gradually over a period of about one-half hour and, thereafter, the reaction temperature should be permitted to rise to the boiling point of the reacting mass gradually over a period of about one and one-half to two hours. When, however, the exothermic reaction commences at a temperature around 70° C., the reaction mixture should be heated to that temperature gradually over a period of about one hour. In such a case, the reaction temperature should be allowed to reach the boiling point of the reacting mass gradually over a period of about one-half to one hour.

The step of rapidly cooling the product from its boiling point to room temperature is equally as important to the properties of our novel products as is the reaction rate described heretofore. In the practice of the invention, once the reaction mass has reached its boiling point it must be cooled to room temperature immediately and as rapidly as possible. Rapid cooling of the mixture serves to halt the polymerization reaction and prevents the formation of a resin having a molecular weight which is higher than desirable. While the manner in which the reaction mass is cooled does not in any way limit the practice of the invention, the means adopted should be sufficiently efficient to reduce the temperature of the reaction mixture to room temperature in a period of at the most about one hour, and preferably about one-half hour.

A convenient means is available for determining, in any particular instance and in advance, the rate at which the condensation reaction should be allowed to proceed and the rate at which the final cooling of the mass to room temperature should be effected. As will be discussed more fully hereinafter, products produced as disclosed herein will have an initial viscosity as determined at a temperature of 25° C. on a Brookfield viscometer using spindle No. 1 at 60 r.p.m., which is within the range of from about 35 to 100 centipoises. By "initial viscosity" as used herein, we mean the viscosity of the reaction mixture immediately after it reaches room temperature. By experimentation, one can accurately determine in trial runs, the rate at which the reaction mixture should be permitted to reach its boiling point and the rate at which the mixture should be cooled to room temperature in order to obtain a product having an initial viscosity within the designated range. When the product is to be produced on a commercial scale, many factors will have a bearing on this, as, for example, the size of the batch, the equipment in use, etc. However, as a general rule, a product having the desired properties will be obtained, in most instances, when the rate of the reaction is controlled so that the reaction mass will reach its boiling point gradually over an interval of from about 1½ to about 2½ hours. Furthermore, while it is desirable to cool the reaction to room temperature as rapidly as possible, as a general rule a product having a viscosity within the indicated range will be obtained when the cooling is accomplished over a period of about one hour or less.

As has been disclosed heretofore, a water-soluble acid is added to the dicyandiamide-aqueous formaldehyde reaction mixture in a sufficiently large amount to reduce the pH thereof to at least about pH 2.5. Preferably, however, a quantity of acid will be added to reduce the pH of the aqueous solution to below about 2.5, as, for example, to within the range of from about 1.5 to 2.5. During the course of the condensation reaction, the pH of the reaction mixture will increase. The final pH of the mixture should be within the range of from about 4.5 to 6.5. Generally, the acid which has been introduced into the system to catalyze the reaction will be sufficient to insure the production of a product having a pH within that range. If the pH of the mixture at the completion of the process is found to exceed 6.5, for example, 6.6 to 7.0, a sufficient quantity of acid should be added thereto to bring the pH thereof to within the range of from 4.5 to 6.5. In any event, adequate measures should be taken during the reaction to prevent the pH of the reaction mixture from rising above about 7.0 at any time during the process. If, at any time, it is observed that the pH of the mixture has risen close to about 7.0 during the reaction, an additional quantity of acid should be added to the reaction mixture to prevent the possibility that the pH will rise above 7.0.

In general, any low molecular weight, water-soluble saturated aliphatic monocarboxylic acid, dicarboxylic acid or hydroxy carboxylic acid can be used as the acid catalyst for the reaction. Furthermore, any such acid can be added to the reacting mass during the course of the condensation reaction to maintain it at a pH below about 7.0. As indicated heretofore, formic acid and glycolic acid are fully suited for use. Suitable also, however, are acids, such as, acetic acid, butyric acid, oxalic acid, malonic acid, glutaric acid, citric acid, lactic acid, etc. In the preferred embodiment of the invention, formic acid is employed.

The quantities of dicyandiamide and formaldehyde which are used in the practice of this invention are variable within certain narrow limits. Broadly, the reaction system should contain a ratio of from about 2.5 to about 3.5 mols of formaldehyde for each mole of dicyandiamide present. Preferably, however, the reaction system will contain a ratio of about 3.0 mols of formaldehyde for each mole of dicyandiamide.

The cationic aminoplast resin compositions which are produced in the practice of this invention are brilliant, substantially water-white, syrupy products. Generally, these will have a solids content within the range of from about 35.0% to about 50.0% by weight. As indicated previously, our products will have an initial viscosity, determined at a temperature of 25° C. using a Brookfield viscometer, spindle No. 1 at 60 r.p.m., which is within the range of from about 35 to about 100 centipoises. The low viscosity of our products is an indication that resins of relatively low molecular weight have been obtained. The viscosities of our products will increase on aging, possibly to a maximum of about 2000 centipoises. However, increases in viscosity in this order of magnitude will not adversely effect the solubility, penetrability or the utility of the products. The tendency of our products to undergo increases in viscosity on aging which are considered to be quite minor serves to differentiate our products from products produced by processes other than disclosed herein. For example, if the reaction was permitted to proceed to completion at a rate faster than that disclosed herein a product having a viscosity in excess of 100 centipoises would be obtained. This would be true also in the case in which the reaction mixture was allowed to reach its boiling point slowly and gradually but was not cooled rapidly to room temperature. While such products would, at the outset, be quite similar in appearance and utility to our products, sharp differences between them would soon become apparent. On aging, products produced by such methods would undergo great increases in viscosity. We have found that products, having an initial viscosity of, for example, about 300 centipoises, will undergo increases in viscosity to about 100,000 centipoises when allowed to stand at room temperature and atmospheric pressure for a period of only about six weeks. At the end of six weeks such a product would have a gel-like consistency and it would not be readily water-soluble. Aqueous solutions of such a product would penetrate heavy leather stock only with some difficulty.

The properties of the products of the present invention are such that they are eminently well suited for use in the tanning of both light and heavy leather stock. These products have a very high affinity to the collagen of the bated pelts of hides and skins and are readily taken up above the isoelectric point of the collagen. When used as the sole tanning agent, the products of the invention penetrate readily and uniformly to give leather having excellent tensile and stitch tear strength. The thickness of the treated stock has no substantial influence on the rate at which the hide is penetrated when treated with our product. Even the most heavy hides are penetrated completely and uniformly in a few hours even when relatively small amounts, as, for example, 3.0%, by weight of the resin, on a dry or solids basis, based on the weight of the bated stock are present. Furthermore, leathers tanned with our products are plump and pliable and they are characterized by a relatively high shrinkage temperature. It has been established that the use of about 10% by weight of our cationic aminoplast resin compositions based on the weight of the bated stock, or about 4.5% by weight of the resin on a dry basis, will impart a shrinkage temperature of from about 88° C. to 89° C. to a heavy stock. Moreover, leather tanned using the products of this invention will be found to be light, stable and it will not darken even when exposed to ultra-violet light.

The products are useful in the pre-treatment of hides and skins which are to be vegetable tanned and also in the after-treatment of vegetable tanned hides and skins. Our products are readily taken up in vegetable tannages which are anionic in nature. The appearance, strength and hand of leather, as well as its resistance to perspiration, can be improved greatly by the pre-treatment or after-treatment of vegetable tanned-leather with the present products. Moreover, the products of the invention can be used successfully for fulling of chrome tanned hides, either alone or as a topping after pre-treatment with anionic compounds. Complete take-up of the resin from the tanning solution will be accomplished under pH conditions which approximate neutrality. However, in the final stage of the tanning process, the addition of a mild alkali, as, for example, borax, will assist in fixing the resin in the pelt.

While the products of this invention have been discussed most particularly with regard to their use in the tanning of leather, it should be understood that their utility is not restricted thereto. The novel cationic aminoplast resin compositions of the invention will find applications in the textile industry, for example, for use as water-proofing and anti-crease agents. Furthermore, our products will be found useful as flocculants in the treatment of waste waters.

For a fuller understanding of the nature and objects of this invention, reference may be had to the following examples which are given merely as further illustrations of the invention and are not to be construed in a limiting sense. All parts given in the examples are parts by weight unless otherwise indicated.

*Example I*

In this example, 84.0 parts (1.0 mol) of dicyandiamide, 235 parts of aqueous formaldehyde (37% by weight) solution (2.9 mols of formaldehyde) and 12.0 parts of formic acid (0.26 mol) were charged into and mixed in a suitable vessel. The mixture had a pH of 2.2. The mixture was heated slowly with continuous stirring for a period of about one-half hour. At the end of that time, a temperature of 55° C. had been reached and the reaction became vigorously exothermic. At this point, heating was discontinued and external cooling was applied to the vessel so as to permit the reaction mixture to reach its boiling point, that is, a temperature of 95° C. to 96° C., in about one and one-half hours.

When this temperature was reached, the mass was cooled immediately and rapidly, by external means applied to the vessel, to a temperature of about 25° C. This was accomplished in a period of about 30 minutes. The reaction mixture was stirred continuously throughout the process. The pH of the mixture when cooled to room temperature was 6.5.

The product obtained had a viscosity, as determined at a temperature of 25° C. using a Brookfield viscometer, spindle No. 1 at 60 r.p.m., of about 85 centipoises. The product was brilliantly clear and water-white and contained about 46% by weight of solids.

The product of the example was evaluated for use as a tanning agent. Before tanning, however, the hides, in this case heavy cow hides splits (8 ounce thickness) were first delimed and bated as follows. They were washed for 15 minutes in three times their weight of water. Thereafter, the splits were transferred to a rotatable drum containing a quantity of water, equal in weight to three times the weight of the splits, in which was dissolved 8.0% by weight, based on the weight of the limed splits, of boric acid. This solution had been heated previously to a temperature of about 35° C. The hides were drummed, that is, rotated in the boric acid solution, for a period of about 30 minutes. Thereafter, 2.0% by weight, based on the weight of the limed splits, of an enzymatic bate was added to the solution and the hides were drummed therein for an additional 2 hour period.

Following this, the bated and delimed hides were drummed in three times their weight of fresh water for a period of about fifteen minutes. Thereafter, the hides were tanned. In the tanning procedure, the hides were first transferred to a drum containing water equal in weight to 75.0% of the dry weight of the hides. The water was at a temperature of 25° C. To this was added 5.0% by weight, based on the weight of the limed hides, of the resin of this example. This solution, and other similar solutions, will be referred to hereinafter for convenience merely as a float. The hides were drummed in the float for a period of about 30 minutes. At the end of this time, an additional quantity of the resin of the example, equal in weight to 5.0% of the weight of the hides, was added to the float. The hides were drummed in the float for a period of three hours. Thereafter, 2.0% by weight, based on the weight of the hides, of borax was added to the float, and the hides were drummed for an additional 2 hours. At the end of this time, the hides were removed from the float, and horsed overnight to fix the tannage.

A test carried out using sodium naphthalene-β-sulfonate revealed that the cationic resin of the example had been taken up completely by the leather. The test involves merely the addition of the sulfonate to the float. The addition of this compound to the float would have precipitated any cationic resin remaining therein. The addition of the sulfonate in this case produced no precipitate indicating complete exhaustion of the cationic resin originally present in the float and complete take-up by the leather of the cationic resin. The leather obtained was plump and it had a shrinkage temperature of 88° C.

After 48 hours' horsing, the hides were washed and fat-liquored using 10.0% by weight, based on the weight of the drained hides, of a multicharge type fat-liquor, that is, a fat-liquor containing a mixture of non-ionic, cationic and anionic ingredients. The hides were dried and finished for white welting leather. The leather thus obtained, was soft, pliable and it had a tight grain.

*Example II*

In this example, 84.0 parts (1.0 mol) of dicyandiamide, 270 parts of aqueous formaldehyde (37% by weight) solution (3.3 mols) and 60.0 parts of 70.0% glycolic acid weer charged into and mixed in a suitable vessel. The mixture had a pH of 2.3 The mixture was heated with stirring at such a rate as to reach a temperature of about 70° C. over a period of about one hour. At this temperature, the exothermic reaction started and heating was discontinued. External cooling was applied to the vessel so as to permit the reaction mixture to reach its boiling point, that is, a temperature of about 98° C., gradually over a period of about 25 minutes. When this temperature was reached, the reaction mixture was cooled immediately and rapidly to room temperature. On cooling, the pH of the mixture was found to be 4.5.

The product obtained was clear and it had a light yellow-green tint. The viscosity of the product, as determined at a temperature of 25° C. using a Brookfield viscometer, spindle No. 1 at 60 r.p.m., was 36 centipoises. It had a solids content of 43.7% by weight.

The product of the example was evaluated for use as a tanning agent for upholstery leather. The hides employed were bated and delimed completely by normal procedures using 4.0% by weight, based on the weight of the limed hides, of boric acid. The hides were pre-tanned using a mixture comprising the product of this example in an amount equal in weight to 7.0% of the weight of the limed hides and borax in an amount equal in weight to 1.0% of the weight of the limed hides. At this stage, the hides had a shrinkage temperature of about 85° C. Thereafter, the hides were pickled in a float comprising 80.0% by weight of water, 8.0% by weight of salt and 2.0% by weight of formic acid, all of said weights being based on the weight of the limed hides. After about twenty minutes, 4.0% by weight, based on the weight of the limed hides, of a basic chrome tannage salt (basicity of 50%) was added to the float in water equal in weight to 20.0% of the weight of the limed hides. The hides were drummed in that float for a period of about five hours. It was noted by the examination of hides during this step that the chrome salt penetrated the hides very rapidly. This was attributable to the use of the chrome salt in combination with the product of this example. At the end of five hours, the hides were removed from the float and horsed for 48 hours.

A very plump and pliable upholstery leather was thus obtained. It showed no shrinkage at a temperature of 100° C.

Having described our invention, what we claim as new and desire to secure by Letters Patent is:

1. A cationic aminoplast resin composition having a solids content of from about 35% to about 50% by weight and an initial viscosity of from about 35 to about 100 centipoises, as determined at a temperature of 25° C. using a Brookfield viscometer, spindle No. 1 at 60 r.p.m., produced by a process consisting of condensing formaldehyde and dicyandiamide as the sole reactants at temperatures which are increased gradually during a period from about 1 to about 2½ hours from room temperature to a temperature within the range of from about 95° C. to about 98° C. and immediately cooling the reaction product from said temperature within the range of 95° C. to 98° C. rapidly during a period up to about one hour to room temperature, the condensation reation having been carried out in the presence of water and having been initiated in the presence of a quantity of a water-soluble saturated aliphatic carboxylic acid sufficient to reduce the pH of said mixture to between about pH 1.5 to pH 2.5, the formaldehyde and dicyandiamide being present in amounts sufficient to provide the reaction mixture with a ratio of from about 2.5 mols to about 3.5 mols of formaldehyde for each mol of dicyandiamide, and water being present in such amounts as to provide the reaction mixture with a ratio of from about 60 parts by weight of water for each 40 parts by weight of formaldehyde to about 70 parts by weight of water for each 30 parts by weight of formaldehyde.

2. A process for preparing a cationic aminoplast resin composition having a solids content of from about 35% to about 50% by weight and an initial viscosity of from about 35 to about 100 centipoises, as determined at a temperature of 25° C. using a Brookfield viscometer, spindle No. 1 at 60 r.p.m., consisting of condensing formaldehyde and dicyandiamide as the sole reactants at temperatures which are increased gradually during a period from about 1 to about 2½ hours from room temperature to a temperature within the range of from about 95° C. to about 98° C. and immediately cooling the reaction product from said temperature within the range of 95° C. to 98° C. rapidly during a period up to about one hour to room temperature, the condensation reaction being carried out in the presence of water and having been initiated in the presence of a quantity of a water-soluble saturated aliphatic carboxylic acid sufficient to reduce the pH of said mixture to between about pH 1.5 to pH 2.5, the formaldehyde and dicyandiamide being present in amounts sufficient to provide the reaction mixture with a ratio of about 3.0 mols of formaldehyde for each mol of dicyandiamide, and water being present in such amounts as to provide the reaction mixture with a ratio of from about 60 parts by weight of water for each 40 parts by weight of formaldehyde to about 70 parts by weight of water for each 30 parts by weight of formaldehyde.

3. The process of claim 2 wherein the water-soluble saturated aliphatic carboxylic acid employed is formic acid.

4. The process of claim 2 wherein the water-soluble saturated aliphatic carboxylic acid employed is glycolic acid.

5. A process for the production of a cationic aminoplast resin composition which consists of mixing (1) formaldehyde and (2) dicyandiamide as the sole reactants in a ratio of from about 2.5 to about 3.5 mols of formaldehyde for each mol of dicyandiamide, (3) water in an amount sufficient to provide the mixture with a ratio of from about 60 parts by weight of water for each 40 parts by weight of formaldehyde to about 70 parts by weight of water for each 30 parts by weight of formaldehyde and a quantity of (4) a water-soluble saturated aliphatic carboxylic acid sufficient to reduce the pH of the mixture to between about pH 1.5 to pH 2.5 and heating said mixture to temperatures increased gradually during a period from about 1 to about 2½ hours from room temperature to within the range of from 95° C. to 98° C. while maintaining the pH thereof below 7.0 and thereafter immediately cooling said mixture rapidly during a period up to about one hour to room temperature.

References Cited in the file of this patent

UNITED STATES PATENTS

| | | |
|---|---|---|
| 2,470,450 | Windus | May 17, 1949 |
| 2,741,535 | Streck | Apr. 10, 1956 |
| 2,746,837 | Kirk | May 22, 1956 |
| 2,827,441 | Romatowski | Mar. 18, 1958 |
| 2,836,574 | Brown | May 27, 1958 |
| 2,870,122 | Sellet | Jan. 20, 1959 |
| 2,950,268 | Confrancesco et al. | Aug. 23, 1960 |
| 2,990,397 | Fetscher et al. | June 27, 1961 |

UNITED STATES PATENT OFFICE
CERTIFICATE OF CORRECTION

Patent No. 3,106,541                                                                           October 8, 1963

Stanley Lipowski et al.

It is hereby certified that error appears in the above numbered patent requiring correction and that the said Letters Patent should read as corrected below.

Column 1, line 17 and lines 21 and 22, for "German Patent No. 323,633", each occurrence, read -- German Patent No. 323,665 --; line 25, for "Patent No. 2,567,328" read -- Patent No. 2,567,238 --.

Signed and sealed this 9th day of February 1965.

(SEAL)
Attest:

ERNEST W. SWIDER
Attesting Officer

EDWARD J. BRENNER
Commissioner of Patents